Oct. 13, 1964   O. S. BLACK   3,153,181

SELECTRON RADIO CONTROL UNIT

Filed Feb. 9, 1962

INVENTOR.
OWEN S. BLACK
BY Kimmel & Crowell
ATTORNEYS.

United States Patent Office 3,153,181
Patented Oct. 13, 1964

3,153,181
SELECTRON RADIO CONTROL UNIT
Owen S. Black, 4920 Cypress Ave., Carmichael, Calif.
Filed Feb. 9, 1962, Ser. No. 172,198
6 Claims. (Cl. 318—16)

This invention relates to a radio wave responsive remote control unit. The unit is particularly adapted for use in conjunction with the remote control equipment in model airplanes and boats, which equipment is operated from distant locations.

The remote control equipment at present in use is in some cases of the multiple channel type, where the transmitter and the receiver are tuned to a radio frequency and audio signals are transmitted to give two or more control channels. An individual relay is provided in each control channel. Energization of one relay causes a servo motor to run in one direction and energization of a second relay causes the servo motor to run in the opposite direction. The circuit connections of the servo motor to the relays are so arranged that when neither relay is energized the servo motor seeks a central position, due to the operation of a switch within the latter.

In other cases the remote control equipment is of single channel type but is cyclic in operation. In the operation of this equipment it must go to the limit of both controls, to the right, then to the left, before returning to the neutral position. In model airplanes and boats where rapid starts, stops and reversals of the ailerons and rudders are required, this develops into an erratic pattern of operation.

The object of the present invention is to provide a remote control unit which may be added to the present multiple channel remote servo equipment used on model airplanes and boats and which will convert same to single channel operation.

Another object of the present invention is to provide a remote control unit which may be used with the present remote control servo equipment on model airplanes and boats and which provides that any degree of control may be held in position as desired.

A further object of the present invention is to provide a remote unit for use in conjunction with the present remote control servo equipment used in model airplanes and boats in which it is possible to reach the limit of control in one direction of operation without going in the other direction of operation.

An additional object of the present invention is to provide a remote control unit for use in association with the present remote control equipment used on model airplanes and boats working on a single frequency channel, in which control movement in either direction may be repeated at will, without having to go through undesirable control movement in the opposite direction.

Still other objects, advantages and improvements will become apparent from the following description, taken in connection with the accompanying drawings, in which.

Figure 1:
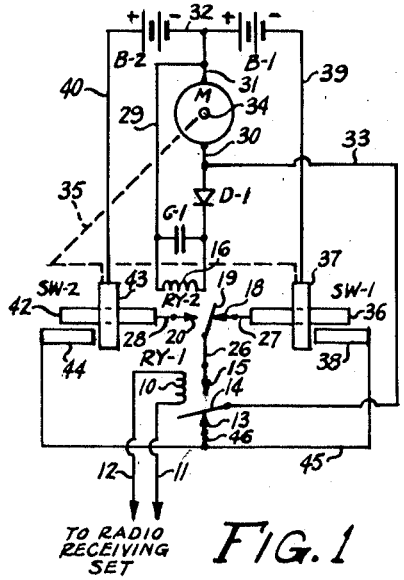
FIGURE 1 is a circuit diagram, with mechanical connections shown schematically, of the remote control unit according to the present invention.

Referring now to the drawings in detail and to FIGURE 1 in particular, the reference numeral 10 here designates the winding of a first relay Ry-1. This is a single pole, double-throw relay. This winding 10 is connected by conductors 11 and 12 to a radio receiving apparatus (not shown), which is located in a suitable position in the model airplane or on the boat, and receives signals from a suitable radio transmitting apparatus (also not shown), which is located in a suitable position on land. This relay has an armature 14, which engages a fixed contact 13, when the relay is in the de-energized condition, and a fixed contact 15, when the relay is energized.

The circuit also includes a second relay Ry-2, the winding of which is designated by the reference numeral 16. This is likewise a single pole, double-throw relay having an armature 19, which engages a fixed contact 18 when the relay is in the de-energized condition, and a fixed contact 20 when the relay is energized. The armature 19 of the relay Ry-2 is connected by a conductor 26 to the normally open contact 15 of the relay Ry-1. The winding 16 of the relay Ry-2 is connected in parallel with the armature of a servo motor M, over a conductor 29 on one side and over a conductor 30 and through a diode rectifier D-1 on the other side. A capacitor C-1 is connected across the winding 16 and provides a time delay factor for the voltage developed across the winding 16.

One side of the winding 16 of the relay Ry-2 is connected by the conductor 29, and one side of the armature of the servo motor M is connected by conductors 31 and 32 to the positive terminal of a battery B-1 and the negative terminal of a battery B-2. These batteries B-1 and B-2 preferably each have an electro-motive force of three (3) volts. The other side of the winding 16 of the relay through the diode D-1 and the other side of the armature of the servo motor are connected by a conductor 33 to the armature 14 of the relay Ry-1.

The servo motor M has a drive shaft 34 and also a duplex built-in selector switch SW-1 and SW-2, the two components of which are the equivalent of single pole, double-throw switches. Both components are operated in unison from the drive shaft 34 of the servo motor M through a mechanical linkage 35. The switch component SW-1 includes a first fixed contact 36, a wiper blade 37, and a second fixed contact 38. The wiper blade 37 continuously rides over the first fixed contact 36, except in its extreme positions to the left and right (FIGURE 1); it also rides over the second fixed contact 38 in its movement toward the right. Similarly, the switch component SW-2 includes a first fixed contact 42, a wiper blade 43, and a second fixed contact 44. The wiper blade 43 likewise continuously rides over the first fixed contact 42, except in its extreme position to the right; it also rides over the second fixed contact 44 in its movement toward the left.

The negative terminal of the battery B-1 is connected by a conductor 39 to the wiper blade 37 of the selector switch component SW-1; similarly, the positive terminal of the battery B-2 is connected by a conductor 40 to the wiper blade 43 of the selector switch component SW-2.

The first fixed contact 36 of the selector switch component SW–1 is connected by a conductor 27 to the normally closed contact 18 of the relay Ry–2; likewise, the first fixed contact 42 of the selector switch component SW–2 is connected by a conductor 28 to the normally open contact 20 of the relay Ry–2. The second fixed contact 38 of the selector switch component SW–1 and the second fixed contact 44 of the selector switch component SW–2 are interconnected by a conductor 45 and are connected by a conductor 46 to the normally closed contact 13 of the relay Ry–1.

In the circuit described, the two relays Ry–1 and Ry–2 are connected in tandem relationship. This arrangement allows the servo motor M to seek its neutral position, just as in the multiple channel equipment at present known. However, in the circuit according to the present invention, only the relay Ry–1 is controlled by radio impulses, the relay Ry–2 being controlled by the current flowing through the armature of the servo motor M.

In operation, the selector switch components SW–1 and SW–2 function to return the servo motor M to its neutral position in the following manner: Let it be assumed that both of the relays Ry–1 and Ry–2 are in their de-energized positions, as shown in FIGURE 1. It will be noted that the wiper blade 37 is always on the first fixed contact 36 of the selector switch component SW–1, except when it is in the extreme position to the left or right (FIGURE 1), and likewise the wiper blade 43 is always on the first fixed contact 42 of the selector switch component SW–2, except when it is in the extreme position to the right. In the neutral position, however, the wiper blade 37 is free of the second fixed contact 38 of the selector switch component SW–1 and the wiper blade 43 is also free of the second fixed contact 44 of the selector switch component SW–2. For rotation of the servo motor M in one direction, which is hereinafter termed the Primary direction, the circuit is from the positive terminal of the battery B–1, over the conductors 32 and 31, through the armature of the motor, over the conductors 30 and 33 to the armature 14 and fixed contact 13 of the relay Ry–1, over the conductors 46 and 45 to the second fixed contact 38, wiper blade 37 and first fixed contact 36 of the selector switch component SW–1, and over the conductor 39 to the negative terminal of the battery B–1. Similarly, for rotation of the servo motor M in the opposite direction, which is hereinafter termed the Secondary direction, the circuit is from the positive terminal of the battery B–2, over the conductor 40 to the wiper blade 43 and the second fixed contact 44 of the selector switch component SW–2, over the conductors 45 and 46 to the normally closed contact 13 and armature 14 of the relay Ry–1, over the conductors 33 and 30, through the armature of the servo motor, and over the conductors 31 and 32 to the negative terminal of the battery B–2.

It will be noted that the wiper blade of the selector switch component SW–1 and the wiper blade 43 of the selector switch component SW–2 are mechanically interconnected by the linkage 35 and are driven from the shaft 34 of the servo motor M. In both of the above-described circuits, if the wiper blade 37 is free of the second fixed contact 38 of the selector switch component SW–1 and the wiper blade 43 is simultaneously free of the second fixed contact 44 of the selector switch component SW–2, the respective circuit is open and there is no flow of current. This is the neutral position of the servo motor M.

If the servo motor M is rotated, in a manner to be later described, to move the wiper blade 37 of the switch component SW–1 to the right, this wiper blade will ride onto the second fixed contact 38 of the switch component. The first described circuit above will now be completed from the positive terminal of the battery B–1, over the conductors 32 and 31, through the armature of the servo motor, over the conductors 30 and 33 to the armature 14 and the normally closed contact 13 of the relay Ry–1, over the conductors 46 and 45 to the second fixed contact 38, the wiper blade 37 and first fixed contact 36 of the switch component SW–1, and over the conductor 39 to the negative terminal of the battery B–1. The servo motor M will now be rotated in the reverse direction and the wiper blades 37 and 43 of the selector switch components SW–1 and SW–2, respectively, will be shifted to the neutral position.

If, however, the servo motor M is rotated in the opposite direction, again in a manner to be later described, to move the wiper blade 43 of the switch component SW–2 to the left, this wiper blade will ride onto the second fixed contact 44 of the switch component. The second described circuit above will now be completed from the positive terminal of the battery B–2, over the conductor 40 to the wiper blade 43, first fixed contact 42 and second fixed contact 44 of the selector switch component SW–2, over the conductors 45 and 46 to the normally closed contact 13 and armature 14 of the relay Ry–1, over the conductors 33 and 30, through the armature of the servo motor M, and over the conductors 31 and 32 to the negative terminal of the battery B–2. The servo motor M will now be rotated in the reverse direction and the wiper blades 37 and 43 of the selector switch components SW–1 and SW–2, respectively, will be shifted to the neutral position.

The above explains the neutralizing action of the servo motor M. It should be noted that this neutralizing action takes place when the relay Ry–1 is in its de-energized condition, without regard to whether the relay Ry–2 is open or closed.

As stated above, the wiper blade 37 is on the first fixed contact 36 of the selector switch component SW–1 and the wiper blade 43 is on the first fixed contact 42 of the selector switch component SW–2, when the servo motor M is at rest. Also, relay Ry–2 is closed on the fixed contact 18. If relay Ry–1 is now energized, due to a signal being received from the radio receiving set (not shown) over the conductors 11 and 12, it closes on the normally open contact 15. A circuit is now completed from the positive terminal of the battery B–1, over the conductors 32 and 31, through the armature of the servo motor M, over the conductors 30 and 33 to the armature 14 and fixed contact 15 of the relay Ry–1, over the conductor 26 to the armature 19 and normally closed contact 18 of the relay Ry–2, over the conductor 27 to the first fixed contact 36 and the wiper blade 37 of the selector switch component SW–1, and over the conductor 39 to the negative terminal of the battery B–1. The polarity of the voltage across the servo motor M is such that the diode rectifier D–1 blocks the flow of current over the conductor 30 to the winding 16 of the relay Ry–2 and this relay remains de-energized. The servo motor M will rotate and drive the wiper blade 37 to the left until it runs off the left end of the first fixed contact 36 of the selector switch component SW–1. This is one extreme position of the servo motor M. As stated above, rotation of the servo motor in this direction is termed the primary direction; the rotation in the opposite direction is termed the secondary direction. Since the energizing circuit of the servo motor M is interrupted at this stage through the selector switch component SW–1, the motor will remain in this position as long as relay Ry–1 is held energized. When the relay Ry–1 is de-energized, the circuit for returning the servo motor M to its neutral position is restored, as described above. The servo motor M then runs in the reverse direction to the neutral position, when the wiper blades 37 and 43 are off the second fixed contacts 38 and 44 of the selector switch components SW–1 and SW–2, respectively. During this return to neutral position, the polarity of the voltage across the servo motor M is reversed from that during rotation of the servo motor to the primary position. The current can now flow through the parallel circuit comprised by the conductor 30, diode rectifier D–1, winding 16 of the relay Ry–2, and over the conductor 29. The capacitor C–1 is charged and the relay Ry–2 is energized, its armature 19 closing on the normally open contact 20.

As long as the relay Ry–1 remains de-energized, the servo motor M tends to seek the neutral position, the energizing circuit of the motor being interrupted through the selector switch components SW–1 and SW–2, and relay Ry–2 returns to its de-energized condition with its armature 19 on the contact 18. If, however, the relay Ry–1 is again energized during return movement of servo motor M to the neutral position, a circuit will be completed as follows: From the positive terminal of the battery B–2, over the conductor 40 to the wiper blade 43 and first fixed contact 42 of the selector switch component SW–2, over the conductor 28 to the normally open contact 20 and armature of the relay Ry–2, over conductor 26 to the normally open contact 15 and armature 14 of relay Ry–1, over conductors 33 and 30, through the armature of the servo motor, and over the conductors 31 and 32 to the negative terminal of the battery B–2. Since the polarity of the voltage across the armature of the servo motor M is still such that relay Ry–2 is energized, the servo motor will rotate until the wiper blade 43 is moved to its secondary extreme position, that is beyond the right end of the first fixed contact 42, of the selector switch component SW–2. At the same time, the wiper blade 37 is also moved to its secondary extreme position, that is beyond the right end of the first fixed contact 36 of the selector switch component SW–1. At this stage, the energizing circuit of the servo motor M is interrupted and relay Ry–2 is de-energized, its armature 19 closing on fixed contact 18. With the wiper blade 37 off the first fixed contact 36 of the selector switch component SW–1, the energizing circuit of the servo motor M is interrupted, and the servo motor remains in its secondary extreme position, as long as relay Ry–1 is held energized by continuous reception of radio signals.

To achieve the result of obtaining the control direction required, without going in the opposite unwanted control direction, the radio transmitting set is keyed as follows: A radio signal comprised of a long signal (———), on and hold, will initiate rotation of the servo motor M in the primary direction and will hold it in the extreme primary position. The cessation of the signal will allow the servo motor M to return to its neutral position. To produce rotation of the servo motor to the secondary control position, the radio signal is applied to start the rotation of the servo motor in the primary direction, and then the signal is released. Before the servo motor reaches the neutral position, the radio signal is reapplied and held on. The servo motor will move the wiper blades 37 and 43 of the selector switch components SW–1 and SW–2, respectively, through the neutral position and to the secondary extreme position, as previously described. If the radio signal is released and then immediately re-applied, while the servo motor is moving the wiper blades 37 and 43 toward the extreme secondary position, the direction of rotation of the servo motor will be reversed, and it will rotate to the extreme control position. This operation allows for quick reversal of the control movement of the servo motor, if needed.

Figure 2:
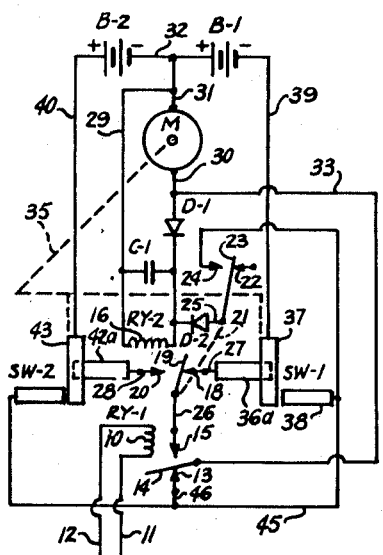
FIGURE 2 shows a modified circuit diagram in which any degree of control position may be held, as desired.

The circuit according to FIGURE 2 provides for holding any degree of control in position, as may be desired. This circuit according to this modification differs from that of FIGURE 1 in three respects. The first fixed contacts 36a and 42a do not overlap the second fixed contacts 38 and 44 in the line of travel of the wiper blades 37 and 43 of the selector switch components SW–1 and SW–2, respectively, as in the modification according to FIGURE 1. The wiper blade 37 does ride over both the first fixed contact 36a and the second fixed contact 38 of the selector switch component SW–1 for a short period, when moving in the secondary direction; similarly, the wiper blade 43 does ride over both the first fixed contact 42a and the second fixed contact 44 of the selector switch component SW–2 for a short period, when moving in the primary direction.

The relay Ry–2 of FIGURE 2 has two armatures 19 and 23, which are interconnected by a link 21, and two sets of contacts 18 and 20 and 22 and 24. When the relay is in its de-energized condition, the armature 19 is closed on the contact 18 of the first set, as in the circuit of FIGURE 1, and the armature 23 is on a rest contact 22; also, when the relay is energized, the armature 19 is closed on the contact 20, again as in the circuit of FIGURE 1, and the armature 23 is on a contact 24. The conductor 45, which interconnects the second fixed contacts 38 and 44 of the selector switch components SW–1 and SW–2, respectively, and the normally closed contact 13 of the relay Ry–1, is extended and connected to the normally open contact 24.

A second diode rectifier D–2 is connected by a conductor 25 to the second armature 23 of the relay Ry–2 and to the conductor 30 from the armature of the servo motor M and first diode rectifier D–1 to one side of the winding 16 of the relay.

The circuit operation of FIGURE 2 is very much the same as that of the circuit according to FIGURE 1. An exception is that the radio signal for the selection of direction must be applied during the period when the wiper blade 37 is on the first fixed contact 36a of the selector switch component SW–1, or when the wiper blade 43 is on the first fixed contact 42a and the second fixed contact 44 of the selector switch component SW–2. After a control direction has been determined by a radio signal and the servo motor M has rotated beyond the point where the wiper blade 37 is riding simultaneously on the fixed contacts 36a and 38 of the selector switch component SW–1, or the wiper blade 43 is riding simultaneously on the fixed contacts 42a and 44 of the selector switch component SW–2, the rotation of the servo motor M may be stopped by interrupting the radio signal momentarily and re-applying it. If the servo motor M is rotating so as to move the wiper blades 37 and 43 of the selector switch components SW–1 and SW–2, respectively, in the primary direction, relay Ry–2 is still in the normal or open condition with its first armature 19 on the contact 18 and its second armature on the rest contact 22, wiper blade 37 is riding over the first fixed contact 36a of the selector switch component SW–1, and wiper blade 43 is riding over the first fixed contact 42a and the second fixed contact 44 of the selector switch component SW–2. Momentary cessation of the signal causes the servo motor M to start to rotate and shift the wiper blades 37 and 43 of the selector switch components SW–1 and SW–2, respectively, to the neutral position. This completes the energizing circuit for the relay Ry–2, the second armature 23 closing on the normally open contact 24. A circuit is now completed from the positive terminal of the battery B–2, over the conductor 40, to the wiper blade 43 and second fixed contact 44 of the selector switch component SW–2, over the conductor 45 to the contact 24 and second armature 23 of the relay Ry–2, over the conductor 25 and through the second diode rectifier D–2, through the winding 16 of the relay Ry–2, and over the conductors 29, 31, and 32 to the negative terminal of the battery B–2. The current thus flowing through the winding 16 of the relay Ry–2 holds the relay closed, as long as the wiper blade 43 is riding on the second fixed contact 44 of the selector switch component SW–2.

If the radio signal is now re-applied, relay Ry–1 is energized and its armature 14 closes on the contact 15, and the energizing circuit for the servo motor M is partially completed over the conductor 26, armature 19 and contact 20 of the relay Ry–2, and over the conductor 28 to the first fixed contact 42a of the selector switch component SW–2. Since, however, the wiper blade 43 is not on the first fixed contact 42a, the energizing circuit of the servo motor M is incomplete at this point, and no current flows in this circuit. The servo motor M, therefore, remains in the instantaneous position that it was in when the radio signal was re-applied. This could be at any position of rotation of the servo motor M in its travel while moving the wiper blades 37 and 43 of the selector switch components SW-1 and SW-2, respectively, to the neutral position. Successive releases and re-applications of the signal cause the servo motor M to rotate and move the wiper blades 37 and 43 of the selector switch components SW-1 and SW-2, respectively, in short steps until the neutral position is reached and the wiper blade 43 is off the second fixed contact 44 of the selector switch component SW-2. This breaks the holding circuit through the winding 16 of the relay Ry-2 and the second diode rectifier D-2 and the servo motor M remains in the position with the wiper blades 37 and 43 in neutral. If the servo motor M is rotating to move the wiper blades 37 and 43 in the secondary direction, after passing the point where the wiper blade 37 is simultaneously on the first fixed contact 36 and the second fixed contact 38 of the selector switch component SW-1, and if the radio signal is interrupted, relay Ry-1 is released and its armature 14 closes on the contact 13, which completes the energizing circuit of the servo motor M and the latter rotates to return the wiper blades 37 and 43 of the selector switch components SW-1 and SW-2 to the neutral position. If now the radio signal is resumed, relay Ry-1 is again energized, its armature 14 closing on the contact 15, and completing the circuit from the positive terminal of the battery B-1 over the conductors 32 and 31 to the servo motor M and over the conductors 30 and 33 to the armature 14 and contact 15 of relay Ry-1, over conductor 26 to armature 19 and contact 18 of relay Ry-2, over conductor 27 to the first fixed contact 36a of the selector switch component SW-1. Since the wiper blade 37 is not at this time on the first fixed contact 36a, the energizing circuit of the servo motor M is broken at this point, no current flows in the circuit and the motor ceases to rotate at this particular position in its sequence of movement.

In this return rotation of the servo motor M to the neutral position with the wiper blade 37 on the second fixed contact 38 of the selector switch component SW-1, the first diode rectifier D-1 blocks the flow of current over the conductor 29, through the winding 16 of the relay Ry-2, de-energizing this relay.

In the circuits of FIGURES 1 and 2, the relay Ry-1 is responsive to the reception of radio signals and the relay Ry-2 is responsive to the current flowing through the armature of the servo motor M. In the circuit of FIGURE 1 the relay Ry-2 can be replaced by a mechanically operated switch. The only requirement for such a switch is that it shall have contacts which are normally closed when the servo motor M is stopped or rotating to move the wiper blades 37 and 43 of the selector switch components SW-1 and SW-2, respectively, in the primary direction, and a normally open contact that closes when the servo motor drives in the secondary direction. The basic idea is still the operation of the switch, which replaces the relay Ry-2, by the servo motor M in a single channel remote control unit in the desired manner.

Figure 3:
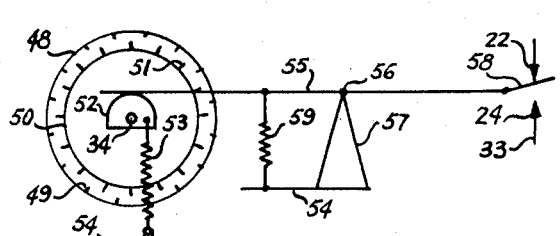
FIGURE 3 shows a switch, which operates from the servo motor through a fluid coupling and which replaces one of the relays in the circuit according to FIGURE 1 or FIGURE 2.

FIGURE 3 shows a fluid coupling for operating a switch of the type described. A cylindrical casing 48 is mounted on and for rotation with the shaft 34 of the servo motor M and has radially positioned blades 49 on its inner circumferential wall. A rotor 50 is freely mounted for rotation on the shaft 34 and has radially positioned blades 51 on its circumference, which are complementary to the radially positioned blades 49 on the inner circumferential wall of the casing 47. The annular space between the cylindrical casing 48 and the rotor 50 is filled with fluid, preferably oil. A semi-cylindrical cam 52 is mounted on the rotor 50 and likewise for free rotation on the shaft 34. This cam is biased to the position where its diameter is horizontal by a coil tension spring 53, which latter is secured at one end to a corner of the cam and at its other end to a suitable fixed support 54. A follower lever 55 rests at one end on the semi-cylindrical cam 52 and normally at the crest of the latter, so that it will be raised by the cam when the shaft 34 is rotated to move the wiper blades 37 and 43 of the selector switch components SW-1 and SW-2 in the secondary direction. This follower lever is pivoted along its length at 56 on a base 57, which also rests on the support 54, or some similar support. A coiled tension spring 59 is connected at one end to the follower lever 55 intermediate the cam 52 and the pivot 56, and at its other end this follower lever carries a blade 58. This blade normally is against the rest contact 22 but, upon rotation of the shaft 34 to move the wiper blades 37 and 43 of the selector switch components SW-1 and SW-2, respectively, in the secondary direction, it will close on the normally open contact 24.

Figure 4:
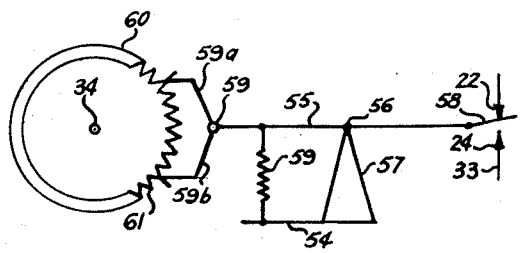
FIGURE 4 shows a switch which is operated from the servo motor through an escapement mechanism, and which likewise replaces one of the relays in the circuit diagram according to FIGURE 1 or FIGURE 2.

In the arrangement according to FIGURE 4, the fluid coupling 48-50 is replaced by an escapement gear 60 having teeth 61 thereon, which gear is mounted on and for rotation with the shaft 34 of the servo motor M. The lever 55 here carries at its outer end an escapement fork 59, having transversely spaced arms 59a and 59b thereon which latter cooperate with the escapement gear 60. The operation of this escapement gear and fork mechanism is similar to that of the fluid coupling arrangement according to FIGURE 3.

Having now fully described my invention, what I claim as new and useful and desire to secure by Letters Patent of the United States is:

1. An electrical control system for model boats and airplanes comprising a reversible servo motor for operating a control element of the model, means for controlling the direction of rotation of said motor in response to signals transmitted through space comprising switch means positioned by said servo motor and operable in a first and second direction through a neutral position, a plurality of circuits completed through said switch means for energizing said servo motor, means for selectively energizing said circuits to impress a voltage of proper polarity across said servo motor including a first relay responsive to said signals, a second relay having a coil connected in series with a unidirectional current means across said servo motor and an armature means having a pair of contacts, one of said contacts being normally closed and the other contact being normally open and closed in response to energization of said coil, means to delay the response of said second relay, said second relay means cooperating with contact means of said first relay means to complete one of said circuits through said normally closed contact for energizing said motor to rotate in a first direction upon receipt of a single transmitted signal, and to complete a second circuit through the normally closed contact to operate the motor in the opposite direction in response to two signals transmitted in close sequence.

2. An electric control system as in claim 1, in which said time delay means comprises a condenser connected across the coil of said second relay.

3. An electrical control system as in claim 1, wherein said first relay means comprises an armature having a pair of contacts, one of said contracts being normally closed and connected to said switch means and the other contact being normally open and closed in response to receipt of a transmitted signal, said other contact of the first relay being connected to the armature of said second relay means.

4. An electrical control system as in claim 3, wherein said servo motor operates a second switch means comprising rotary actuating means, one side of said switch means being attached by unidirectional current means to one side of the coil of said second relay and the other side of said switch means being attached by conductor means to the switch of the switching network to provide a circuit for holding any degree of operation of the control in position as desired during the operation thereof.

5. An electrical control system as in claim 3, wherein said second relay has a second armature attached by unidirectional current means to one side of the coil of said second relay and having a pair of contacts, one of said contacts being normally closed and unattached to the circuitry and the other contact being normally open and closed in response to energization of said coil of the second relay, said other contact of said second pair of contacts being connected by a conductor to said switch means operated by said servo motor to provide a circuit for holding any degree of operation of the control in position as desired.

6. An electrical control system as in claim 3, wherein said means for selectively energizing said circuits comprise two batteries.

References Cited in the file of this patent
UNITED STATES PATENTS

| | | |
|---|---|---|
| 2,494,611 | Eisenberg | Jan. 17, 1950 |
| 3,002,140 | Bonner | Sept. 26, 1961 |